F. F. HUGHES.
HOVER.
APPLICATION FILED MAY 26, 1917.
1,236,086.
Patented Aug. 7, 1917.
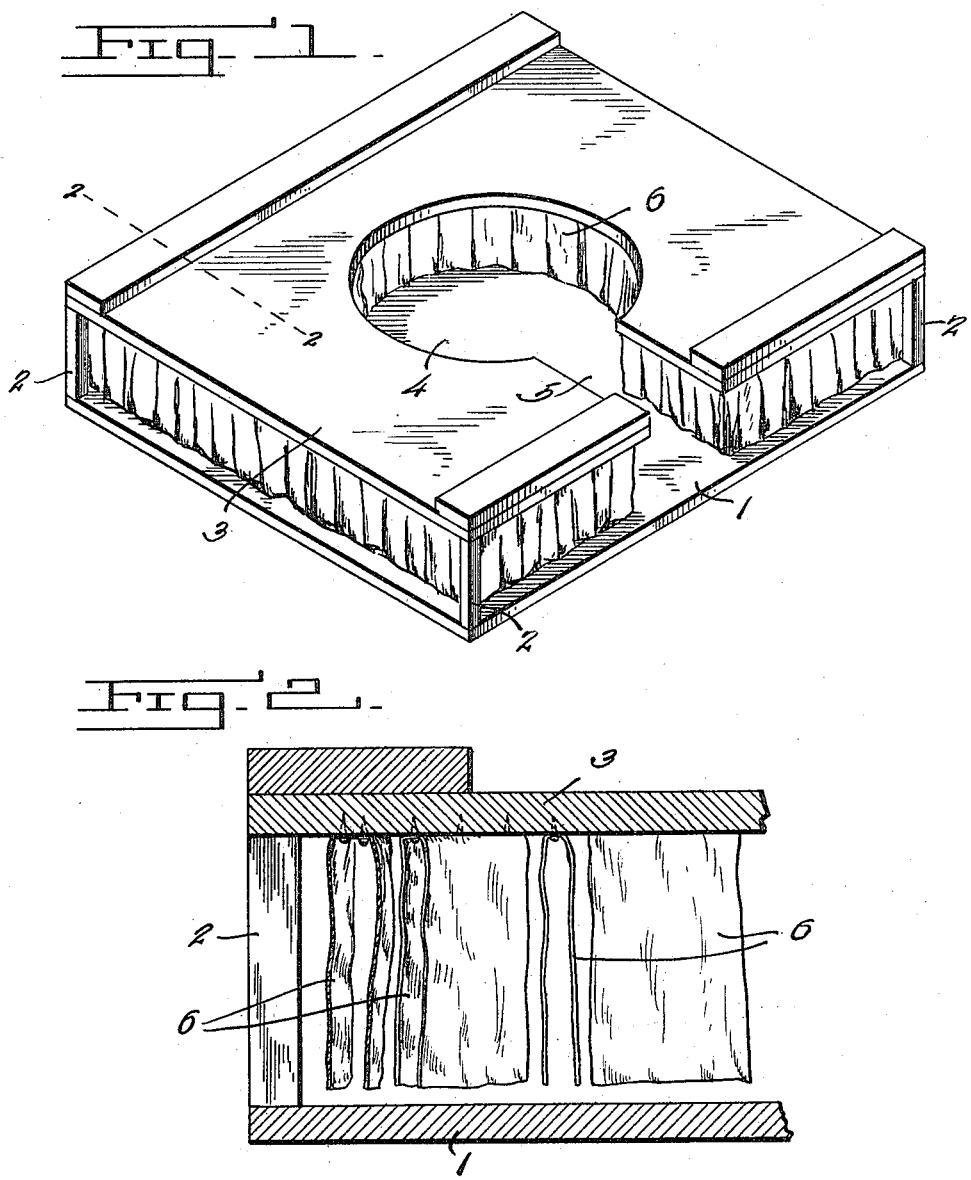
Inventor
Fred F. Hughes.
Witness
By Lester L. Sargent
Attorney

UNITED STATES PATENT OFFICE.

FREDERICK F. HUGHES, OF HILLSBORO, OREGON.

HOVER.

1,236,086.                Specification of Letters Patent.         Patented Aug. 7, 1917.

Application filed May 26, 1917. Serial No. 171,244.

*To all whom it may concern:*

Be it known that I, FREDERICK F. HUGHES, a citizen of the United States, residing at Hillsboro, in the county of Washington and State of Oregon, have invented a new and useful Hover, of which the following is a specification.

The object of my invention is to provide a novel hover by means of which the brooding capacity of a hen is multiplied, enabling one hen to care for a large brood of chicks. Further it is my object to provide a novel hover adapted for the housing of both hen and chicks within a brooder, the hover being readily removable for any purpose.

I attain the object of my invention by the mechanism illustrated in the accompanying drawings in which—

Figure 1 is a perspective view of my hover, and Fig. 2 is a section on line 2—2 of Fig. 1.

Like numerals designate like parts in each of the views.

Referring to the drawings I provide a hover consisting of a base 1 on which are mounted suitable posts 2 supporting the roof 3, from the interior of which are suspended a multiplicity of suitable strips 6 of cloth or other material suitable for use for the protection of young chicks. I provide roof 3 with a novel passage 5 opening from one side to the circular opening 4 at the center of the hover, as shown in Fig. 1.

The round opening 6 is of sufficient size to accommodate a hen, and the hover affords sufficient protection for the chicks that can not gather under the wings of the hen. By this device one hen is enabled to brood 200 or more chicks as effectively as she could care for 15 or 20 without this device. The hover is placed within any suitable brooder (not illustrated). It may be supported in any suitable manner so as to be readily removed from the brooder. It is within the contemplation of my invention to modify the shape, size or number of parts described.

What I claim is:

In a hover adapted for housing a hen and chicks within a brooder, the combination of a hover having an approximately round opening at its center and having a passage way from one side to enable the hen to reach the opening, whereby to increase the brooding capacity of a hen.

FREDERICK F. HUGHES.

Copies of this patent may be obtained for five cents each, by addressing the "Commissioner of Patents, Washington, D. C."